United States Patent [19]

Schaefer et al.

[11] 4,331,565

[45] May 25, 1982

[54] METHOD FOR FORMING HIGH SURFACE AREA CATALYST CARRIER AND CATALYST USING SAME

[75] Inventors: Carl F. Schaefer, Flint; Raymond E. Bedford, Burton, both of Mich.

[73] Assignee: General Motors Corporation, Detroit, Mich.

[21] Appl. No.: 211,371

[22] Filed: Nov. 28, 1980

[51] Int. Cl.³ .................. B01J 21/04; B01J 23/10; B01J 23/42; B01J 23/44
[52] U.S. Cl. ................................ 252/462; 423/213.5
[58] Field of Search ..................... 252/462; 423/213.5

[56] References Cited

U.S. PATENT DOCUMENTS

| | | | |
|---|---|---|---|
| 3,903,020 | 9/1975 | Sergeys et al. | 252/455 R |
| 3,951,867 | 4/1976 | Howell | 252/462 |
| 3,956,188 | 5/1976 | Hindin et al. | 252/465 |
| 3,993,572 | 11/1976 | Hindin et al. | 252/462 |
| 4,096,096 | 6/1978 | Nishikawa et al. | 252/466 J |

Primary Examiner—W. J. Shine
Attorney, Agent, or Firm—Sidney Carter

[57] ABSTRACT

An alumina base catalyst carrier material which is thermally stable and possesses a high surface area consisting of a cerium oxide coating on active alumina granules. The carrier is prepared by the precipitation of cerium hydroxide from an aqueous slurry of the alumina granules also containing the water soluble salts of cerium.

6 Claims, 5 Drawing Figures

METHOD FOR FORMING HIGH SURFACE AREA CATALYST CARRIER AND CATALYST USING SAME

BACKGROUND OF THE INVENTION

The present invention relates to automotive emission catalysts and specifically relates to a thermally stable high surface area catalyst carrier useful for supporting oxidation and/or reduction catalysts at elevated temperatures.

It is known that catalyst carrier materials for automotive emissions use should possess high surface area, refractoriness, and thermal stability. High surface area in the carrier increases catalyst dispersion which retards activity loss resulting from catalyst agglomeration and sintering, and increases the accessible catalyst surface area.

A wide variety of refractory metal oxides and metal oxide mixtures have been utilized to support noble metal and base metal catalysts, including alumina, silica, magnesia, titania, zirconia, and mixtures thereof. Many of these exhibit substantially reduced surface areas following exposure to temperatures in the 800° C. range. We have found that the catalysts resulting from use of our invention are effective over the entire 50,000 mile test schedule specified by Federal Government Regulations and thus indicate resistance to poisoning by sulfur, phosphorus and lead found in an engine exhaust stream. Thus we are able to place the noble metal catalyst materials at the surface of the support as distinguished from other techniques which place the catalyst materials interior of the surface for protection from poisoning as disclosed in U.S. Pat. Nos. 4,128,506 and 4,152,301 and 4,153,579 issued to Summers and Hegedus on Dec. 5, 1978, May 1, 1979, and May 8, 1979, respectively.

SUMMARY OF THE INVENTION

We have discovered an alumina base catalyst carrier material which is refractory, thermally stable, and possesses high surface area. More particularly, the carrier of our invention comprises a cerium oxide coating on active alumina granules. Our carrier is prepared by the precipitation of cerium hydroxide onto the alumina from an aqueous slurry of the alumina granules to which has been added the water soluble salts of cerium.

It is therefore an object of our invention to provide a thermally-stable, high surface-area catalyst carrier comprising active alumina granules on which there is coated the oxide of cerium. It is another object of our invention to provide a simple method for making a cerium oxide-coated alumina-granule catalyst carrier, specifically, precipitating the hydroxide precursor of cerium oxide onto the alumina granules from an aqueous slurry containing the granules and soluble salts of cerium. It is a further object of our invention to provide a catalyst comprising a refractory ceramic support coated by a thermally-stable, high surface-area, active alumina-granule catalyst carrier which is impregnated with the active catalyst material. These and other objects and advantages of our invention will be apparent from the description which follows taken in conjunction with the drawings in which there is shown the efficiency of catalytic conversion over an 800 hour period for a dual bed converter system.

DESCRIPTION

Figure 1:
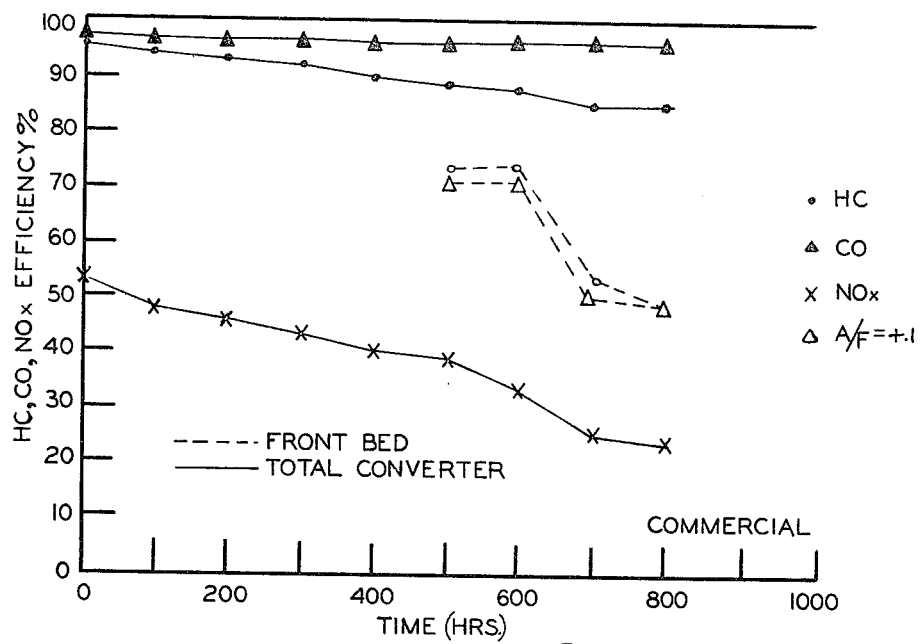
FIG. 1 showing the results for a commercial monolith pair made by unknown techniques other than in accordance with our invention.

In response to the continually more stringent emission standards related to hydrocarbon, carbon monoxide and oxides of nitrogen content of an automotive exhaust stream, much effort has been and continues to be applied in the development of catalysts and their methods of preparation in order to achieve improvements in life, efficiency of conversion, and lower costs of production. Illustrative of the advances in this field are the U.S. Pat. Nos. 4,096,096 dated June 20, 1978 to Nishikawa et al., 3,956,188 dated May 11, 1976 to Hindin et al, 3,951,867 dated Apr. 20, 1976 to Howell, and 3,903,020 dated Sept. 2, 1975 to Sergeys et al. U.S. Pat. No. 4,096,096 discloses a method for preparing a catalyst comprising either the precipitation of alumina onto the surface of an iron-containing substance or the coprecipitation of aluminum and iron from their soluble salt solution, followed by filtration-washing-drying-molding and calcining, iron being the principal catalytic ingredient. U.S. Pat. No. 3,956,188 discloses a catalyst carrier prepared by the coprecipitation of aluminum, chromium and cerium from a solution of their water soluble salts, the resultant filter cake being dried and slurried to coat a monolith which is then calcined before impregnation with a noble metal salt solution. U.S. Pat. No. 3,951,867 discloses a catalyst carrier prepared by the coprecipitation of cerium and tin from an aqueous solution of their salts, the resultant filter cake being dried and slurried with a soluble cobalt salt, a monolith support being coated with the slurry and then calcined. U.S. Pat. No. 3,903,020 discloses the use of a catalyst coating of alumina containing cerium oxide produced by impregnating alumina with a cerium nitrate solution, this composite being dried and calcined at 1800°–2000° F. for an extended period.

As a result of our laboratory and engine testing we have discovered an improved coating for application to a ceramic catalyst-support structure. While the tests disclosed herein were conducted using a monolith or honeycomb support, it should be understood that other support structures such as pellets, beads, and the like may also be used. Our coating serves as an improved catalyst carrier giving improved catalytic performance at lean A/F ratios close to stoichiometric due to the method of forming the carrier, a small but effective amount of cerium being used with $Al_2O_3$ to achieve improved $O_2$ storage and stabilization performance.

In preparing the catalyst carrier material of our invention a slurry is prepared using alumina powder, the size of the alumina granules being preferably in the size range of a minimum of 40% by weight less than 25μ and a maximum of 15% by weight greater than 90μ. While other active aluminas well known in the art may be used we prefer to use an alumina mixture such as disclosed in assignee's abandoned application, U.S. Ser. No. 783,188, hereby incorporated by reference, consisting essentially of about 50% by weight gamma alumina and the balance alpha alumina monohydrate. The alpha alumina monohydrate may be any of the commercially available materials, e.g., that known as Dispural ® furnished by Condea Chemie, Hamburg, West Germany. The gamma alumina is prepared by calcining the Dispural ® at a temperature of about 550°–650° C. for a period of three hours. A water solution of a soluble salt of cerium is added to the alumina slurry while stirring vigorously to obtain a homogeneous mixture. A weight ratio of cerium metal to alumina of from about 3.5–7%:96–.5–93% is preferred. More cerium would add to cost without improving performance.

The resulting slurry is then adjusted in pH to a level of about 8 to 10 in order to precipitate the cerium from the aqueous suspension of alumina. This is accomplished by the addition of a precipitant, e.g., $NH_4OH$ to the slurry accompanied by vigorous stirring for a period sufficient to obtain substantially complete precipitation of cerium as a uniform, adherent coating of cerium hydroxide on the alumina grains.

Upon completion of precipitation, the alumina-cerium hydroxide is separated from the aqueous solution by any suitable means such as filtration, the residue being thoroughly washed with distilled water to remove remaining salts as noted below. Distilled water is used to avoid introduction of impurities which might reduce resistance of the composite catalyst carrier material to sintering and loss of surface area at operating temperatures. The washed residue is then dried at about 110° C., analysis indicating that the cerium exists as a hydrated oxide coating on the alumina granules. This resulting composite material constitutes the catalyst carrier of our invention and as such is suitable for regrinding and slurrying in water for application to a ceramic support structure by any suitable technique well known in the art, e.g., spray coating, dipping, coating as disclosed in U.S. Pat. No. 4,191,126 to Reed et al dated Mar. 4, 1980. The active catalyst materials such as the transition metals, e.g., chromium, iron, cobalt, nickel, and the noble metals of Group VIII of the Periodic Table of Elements, e.g., platinum, palladium, rhodium, may be applied to the support structure by adding their water soluble salts in the desired and catalytically effective amounts to the slurry containing the reground catalyst carrier of our invention. This intermixture of slurry and salt solution makes possible homogeneity and maximum dispersion of the active catalyst material.

EXAMPLE 1

As a specific example of the preparation of the catalyst carrier of our invention, a portion of as-received Dispural ® was calcined at 650° C. to convert the alumina monohydrate to γ alumina, a mixture of 166.42 g. of each of the calcined and as-received material being slurried in 1000 g. distilled water. A solution of 67.16 g. $Ce(NO_3)_3.6H_2O$ in 320 g. distilled water was then added to the alumina slurry while stirring.

Other water soluble salts of cerium may of course be used in amounts to achieve the equivalent amount of cerium hydroxide precipitate as here illustrated. A uniform, adherent coating of cerium hydroxide on the alumina granules was obtained by the addition of ammonium hydroxide in amounts sufficient to achieve complete precipitation of the cerium. Specifically, we added 120 ml. of reagent grade ammonium hydroxide, $NH_3$ in the range of from 28.5 to 30.0% by weight, to the alumina-cerium slurry while stirring vigorously, the precipitation occurring in accordance with the following reaction:

$$Ce(NO_3)_3 + 3NH_4OH \rightarrow Ce(OH)_3 + 3NH_4NO_3$$

The resulting aqueous suspension of coated alumina granules was then filtered and the residue was thoroughly washed using distilled water and then dried at 110° C. The resulting alumina granules coated by the hydrated oxide of cerium, $Ce_2O_3.xH_2O$, constitutes the catalyst carrier of our invention and was in condition for further processing to produce the desired supported catalyst.

In preparation for coating the catalyst support, cordierite monolith in this instance, the dried filter-cake was crushed to pass a 48 mesh screen and was ball milled in water to form a slurry. More particularly, 740 g. of the −48 mesh ceria hydrate-coated alumina granules together with a small amount of a dispersant, e.g., 0.92 g. sodium ligno-sulfonate, and a small amount of a binder, e.g., 3.36 g. hydroxyethyl cellulose, were mixed with 1111 g. distilled water, the mixture being milled in a gallon-size jar mill for 2 hours using 6000 g. of high density, 1 inch diameter alumina balls. The organic additives are used to assist in uniformly coating the monolith support.

A catalyzed coating slurry was produced by mixing catalyst metal solution with the slurry. In this instance an aqueous noble metal solution was prepared using 3.41 g. palladium chloride (@ 60.00% Pd)
12.92 g. chloroplatinic acid (@ 39.52% Pt)
2.82 g. rhodium chloride (@ 36.21% Rh)
75 g. distilled water.
(HCl and heat being used to dissolve the $PdCl_2$).

This was mixed with 2000 grams of slurry containing the coated alumina carrier of our invention, the slurry being stirred vigorously while the catalyst solution was added drop-by-drop to assure even distribution of the catalyst materials over the surface of the ceria hydrate-coated alumina granules. Also, we prefer to continue stirring for at least 15 minutes after completion of the intermixture. We stabilize viscosity by allowing the catalyzed coating slurry to stand for about 16 hours. The viscosity may then be adjusted as required for the particular coating process used.

Coating of a commercially available monolith having 400 cells per square inch for use as the 3-way monolith was accomplished using the vacuum draw-down method of U.S. Pat. No. 4,208,454 to Reed et al., dated June 17, 1980. This produced a dry coating weight of 124.31 grams. The precious metal loading was 0.025 troy ounces Pt, 0.010 troy ounces Pd, and 0.005 troy ounces Rh, and the cerium-alumina loading was 7 Ce:93 $Al_2O_3$. During the course of testing as described hereinafter, we used equivalent commercial monolith support structures from two sources, each monolith having 400 cells per square inch and each being elliptical, measuring as follows in inches:

|  | Monolith Size | |
|---|---|---|
|  | Front | Rear |
| minor axis | 3.2 | 3.2 |
| major axis | 5.7 | 5.7 |
| length | 6 | 5 |

Figure 2:
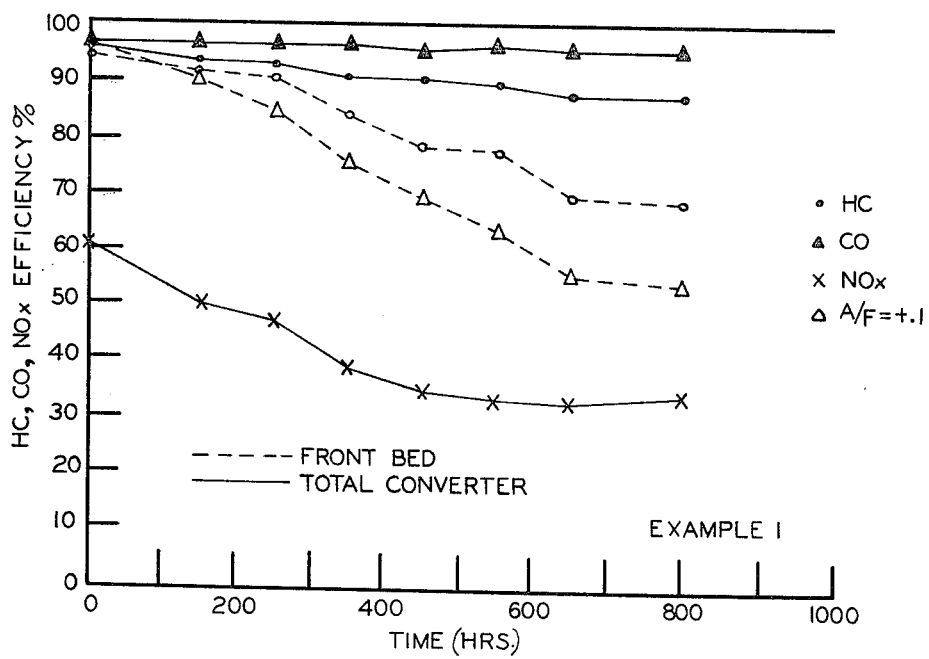
FIG. 2 showing the results for a monolith pair made in accordance with our invention as described under Example 1.
Figure 3:
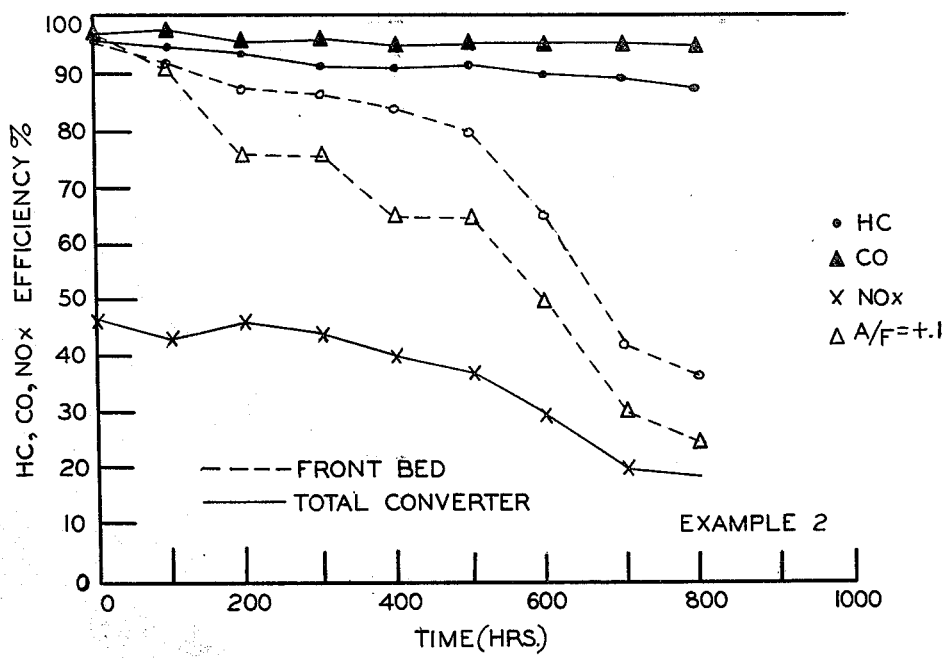
FIG. 3 showing the results for a monolith pair made by a process other than per our invention as described under Example 2.
Figure 4:
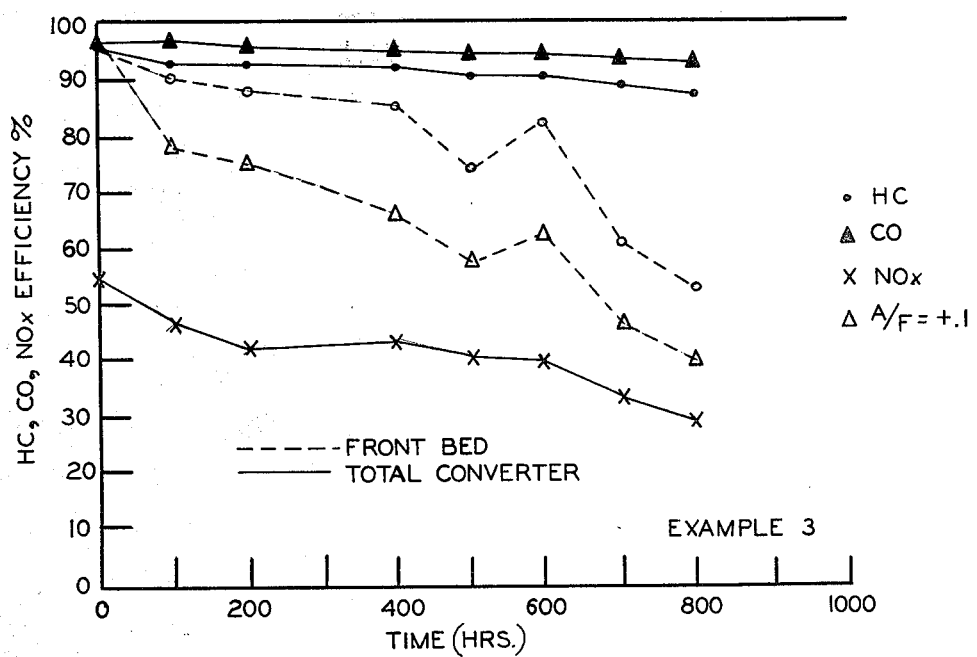
FIG. 4 showing the results for a monolith pair made in accordance with our invention as described under Example 3.
Figure 5:
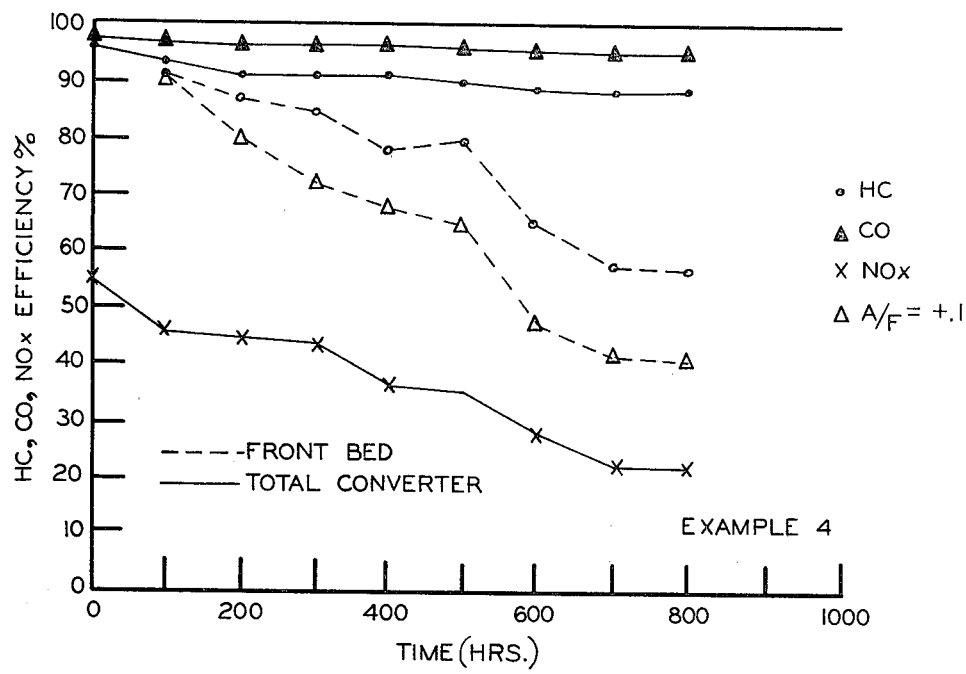
FIG. 5 showing the results for a monolith pair made by a process other than per our invention as described under Example 4.

To complete the monolith set for use in the dual bed converter durability testing shown in FIG. 2, we coated a second monolith using the same methods as described above for the 3-way monolith. Since the second monolith serves the oxidation function only, it was coated using a catalyst carrier slurry made in accordance with our invention but catalyzed with only Pt and Pd. The catalyst solution is formed using 4.088 grams palladium chloride, 15.517 grams chloroplatinic acid, and 75 grams distilled water, this solution being added to 2000 grams of ceria-alumina slurry as above described. After adjustment of viscosity and application to the support, all as above described, the monolith had a dry coating of 103.64 grams. The precious metal loading was 0.025 troy ounces Pt and 0.010 troy ounces Pd, and the cerium-alumina loading was 7 Ce:93 $Al_2O_3$. The coated monolith was of course calcined at a temperature and for a period sufficient to set the catalyst and carrier on the support, a temperature of about 427° C. for a period of three hours being suitable. Such calcining is conventional and is applied to each coated monolith.

EXAMPLE 2

By way of comparison with the catalyst carrier of our invention, we prepared a ceria-alumina catalyst carrier using a conventional disc pelletizing procedure. Specifically, the dry alumina monohydrate was fed onto the rotating disc at a rate of 129 grams/min. while being sprayed with an aqueous cerium nitrate solution at a rate of 68 ml/min. Each 68 ml of solution contained 22 grams $Ce(NO_3)_3.6H_2O$. Half of the pellets were dried and then calcined at 650° C. for 1 hour, the other half being calcined at 260° C. for 1½ hours.

A coating slurry was prepared in the same manner as in Example 1 by ball-milling the following mixture:

366 grams of the 260° C. calcined pellets
374 grams of the 650° C. calcined pellets
0.92 grams sodium lignosulfonate
3.36 grams hydroxyethyl cellulose
1111 grams distilled water.

A catalyst solution was prepared using the noble metal stock solutions as in Example 1 in the following amounts:

13.07 grams $H_2PtCl_6$
2.85 grams $RhCl_3$
3.44 grams $PdCl_2$
24.26 grams $Ce(NO_3)_3.6H_2O$ $Ce(NO_3)_3$ improved noble metal dispersion. The solution was diluted with distilled water to 150 ml, and included HCl to help dissolve the $PdCl_2$.

2,000 Grams of the coating slurry was catalyzed by mixing with the catalyst solution, this being applied to the monolith (for front positioning in the converter) in the same manner as for Example 1. This produced a dry coating of 127.5 grams with the same precious metal and cerium-alumina loading as for the front bed in Example 1.

The rear or oxidizing monolith was prepared with a coating made using 2,000 grams of the same coating slurry as prepared for the front bed monolith in this Example. This slurry was catalyzed using the following mixture diluted to 300 ml with distilled water as above for the front bed:

15.69 grams $H_2PtCl_6$
4.13 grams $PdCl_2$
23.92 grams $Ce(NO_3)_3.6H_2O$.

Using the coating and calcining methods previously described, a dry coating of 106.1 grams was obtained with the same precious metal loading and cerium-alumina loading as for the rear bed in Example 1.

EXAMPLE 3

By way of establishing a range for the cerium-alumina loading in preparing a catalyst carrier in accordance with our invention, a front bed monolith was coated and calcined using the same methods and materials as in Example 1. Only the constituent amounts noted below were changed to produce a dry coating of 123.6 grams with a cerium-alumina loading of 3.5 Ce:96.5 $Al_2O_3$, the precious metal loading being the same as in Example 1.

The precipitant solution was prepared using 29.49 grams $Ce(NO_3)_3.6H_2O$ in 320 grams distilled water.

The catalyzing solution was prepared by mixing a Pd solution of 3.355 grams $PdCl_2$ and 50 grams distilled water (HCl and heat being used to dissolve the salt) with a solution of 12.904 grams $H_2PtCl_6$ and 2.779 grams $RhCl_3$ in 25 grams distilled water.

Similarly, a rear bed monolith was coated and calcined using the same methods and materials as in Example 1. Only the constituent amounts noted below were a cerium-alumina loading of 3.5 Ce:96.5 $Al_2O_3$, the precious metal loading being the same as in Example 1. Specifically, the palladium chloride used was 4.029 grams and the chloroplatinic acid used was 15.494 grams.

EXAMPLE 4

By way of further comparison with the catalyst carrier of our invention, we prepared a ceria-alumina catalyzed carrier using the conventional solids-solution impregnation method of the prior art. More particularly, 906.4 grams of alumina monohydrate and 906.4 grams of calcined, as in Example 1, alumina monohydrate were mixed with 2,000 grams of distilled water for a period of about 5 min. to produce a slurry. A solution of 187 grams $Ce(NO_3)_3.6H_2O$ in 500 grams distilled water was then added to and mixed with the slurry for a further period of about 5 min. Instead of precipitating the cerium on the alumina, the cerium-alumina slurry was dried and then calcined at a temperature of 260° C. for 1½ hours. The calcined material was then ball-milled as described above with regard to the filter cake in Example 1.

A front bed catalyzing solution was prepared by intermixing the following constituents, concentrations being the same as previously stated:

| 14.08 grams | Chloroplatinic Acid | $H_2PtCl_6$ |
| 3.03 grams | Rhodium Chloride | $RhCl_3$ |

-continued

| | | |
|---|---|---|
| 3.06 grams | Palladium Chloride | PdCl$_2$ |
| 32.24 grams | Cerium Nitrate | Ce(NO$_3$)$_3$ . 6 H$_2$O |
| 17.86 grams | Cerium Oxide Powder | (−2 microns) |

The catalyst solution was then mixed with 1929.9 grams of the milled slurry and applied to the monolith in the same manner as described under Example 1 to produce a dry coating weight of 119.6 grams having a cerium, alumina and precious metal loading exactly the same as for the front monolith of Example 1. As in each Example covered herein, the coated monolith was fired as in Example 1.

The rear or oxidizing monolith was coated as in Example 1 and all other Examples using 1928.9 grams of the milled ceria-alumina slurry, prepared as for the front bed in this Example 4, after mixing with the catalyst solution as in Example 1 and all other Examples. The catalyst solution was made up using the following constituents, concentrations being the same as previously stated for Example 1 and all other Examples:

| | | |
|---|---|---|
| 16.91 grams | Chloroplatinic Acid | H$_2$PtCl$_6$ |
| 4.40 grams | Palladium Chloride | PdCl$_2$ |
| 31.76 grams | Cerium Nitrate | Ce(NO$_3$)$_3$ . 6 H$_2$O |
| 18.04 grams | Cerium Oxide | Ce$_2$O$_3$ (−2 microns) |

A dry coating weight of 99.6 grams was applied and yielded cerium, alumina and precious metal loading the same as on the rear bed monolith under Example 1. This resulted in a dry coating weight of 99.6 grams with a cerium-alumina loading of 7 Ce:93 Al$_2$O$_3$ and a precious metal loading of 0.025 troy ounces of Pt and 0.010 troy ounces of Pd.

As in each Example disclosed herein, both front and rear bed, the coated monolith is calcined to produce the finished catalyst. Also, the precious metal loading in each of the front bed monoliths and in each of the rear bed monoliths is the same. Where cerium nitrate solution and/or cerium oxide solids are added to the catalyst solution, this is done to achieve greater dispersion of the catalyst salts and to retain a 7 Ce:93 Al$_2$O$_3$ ratio in the final coating. The monolith supports used in each of the Examples were elliptical in shape, each having 400 cells to the square inch and having a minor axis of 3.2 inches and a major axis of 5.7 inches, the length of each front bed monolith was 6 inches, that of each rear bed monolith being 5 inches.

As stated above, the pair of catalyzed monoliths in each of the Examples 1 through 4 was assembled in a dual bed converter with provision for air injection between the front and rear bed to assure clean-up of unburned and unconverted carbon monoxide and hydrocarbons from the front bed. The system was controlled during all dynamometer tests to supply air at the rate of 10% of the total exhaust gas flow. All tests were conducted using a V-8 305 cubic inch displacement engine under the Federal test standard titled "Accelerated Simulated AMA Durability Driving Schedule."

The performance durability for each of Examples 1 through 4 is shown in FIGS. 2 through 5, respectively, FIG. 1 showing the results for a commercial monolith pair made by unknown techniques but using monolith supports of the same physical dimensions and having the same noble metal loading, both front and rear supports, as those of our Examples. In each of the FIGURES, the solid lines represent activity for the total converter whereas the dashed lines represent activity for the front bed only.

It is considered that the front bed activity is significant from the standpoint of demonstrating the benefits resulting from use of our invention since it does not have secondary air injection and thus HC and CO performance are primarily the result of catalyst dispersion and access to catalyst. Also, NO$_x$ activity demonstrates the real benefits to be achieved by use of our invention. Further, the data shown in the drawings reflects an over-all improvement in conversion efficiency for HC and CO as the catalyst ages.

In reviewing the data shown on the charts, it should be noted that Examples 1 and 3 cover the method of and catalyst made in accordance with our invention, Example 1 covering a catalyst carrier having the ratio Ce 7:Al$_2$O$_3$ 93 and Example 3 having the ratio Ce 3½:Al$_2$O$_3$ 96½. Examples 2 and 4 cover catalysts having the ratio Ce 7:Al$_2$O$_3$ 93. Example 2 carrier was made by disc pelletizing the Al$_2$O$_3$ with cerium nitrate, the beads being ground and slurried after heating and firing. Example 4 carrier was made by slurrying Al$_2$O$_3$ with cerium nitrate solution, this being dried, ground and reslurried. The pair of commercial monoliths was prepared using an alumina carrier but composition and method are unknown except that the noble metal loading was the same as that for each monolith in each Example. The comparative results of the described durability testing for Examples 1 and 3 are shown in the following Tables I and II.

TABLE I

Dual Bed Converter* Operation

| | |
|---|---|
| Example 1 | |
| HC | better than the results for commercial after about 400 hours; about the same as for Examples 2 and 4; better than for Example 3. |
| CO | about the same as for commercial and Examples 2 and 4; better than for Example 3. |
| NO$_x$ | better than for commercial and for Examples 2, 3, and 4. |
| Example 3 | |
| HC | better than the results for commercial; not as good as for Example 1; about the same as for Examples 2 and 4. |
| CO | not as good as for commercial and Example 1; about the same as for Example 2; and somewhat better than Example 4. |
| NO$_x$ | better than the results for commercial after about 500 hours; not as good as for Example 1; better than for Examples 2 and 4. |

*operating in a closed loop, computer controlled system.

TABLE II

Front Bed Operation

| | |
|---|---|
| Example 1 | |
| HC | better than the results for commercial and for Examples 2, 3, and 4. |
| CO | better than for commercial; better than for Examples 2, 3, and 4. |
| Example 3 | |
| HC | better than the results for commercial and for Example 2; not as good as for Example 1; about the same as for Example 4 up to about 530 hours and better than 4 for about 530-730 hours. |
| CO | not as good as for commercial and Example 1; better than for Example 2; about the |

TABLE II-continued

Front Bed Operation same as for Example 4 up to about 530 hours and better than for Example 4 for about 530–730 hours.

It should be understood that the above are merely examples of the application of our catalyst carrier to a catalyst support. Other supports, both pellet and monolith, and other applications, would require adjustment of precious catalyst material or metal loading and amounts of catalyst carrier materials as needed for desired results. $NO_x$ reduction takes place in the front bed which includes rhodium.

We have found that the precipitation of the cerium on the alumina granules results in a well-dispersed composite with the alumina wherein the cerium hydroxide is converted to an active hydrated oxide upon drying to remove free water. This form promotes dispersion of the noble metal in the coating slurry resulting in especially active and durable catalysts.

From the foregoing it may be seen that we have provided a catalyst carrier coating and resulting catalyst which produce improved results in the control of vehicle emissions. While other embodiments and variations may be apparent to those skilled in the art, for example, the separated coated $Al_2O_3$ may be treated to remove the residual water and soluble salts resulting from the precipitation of cerium hydroxide by washing or heating the precipitate as suited to the particular salt and manufacturing process economics, these are within our invention as covered by the claims which follow.

The embodiments of the invention in which an exclusive property or privilege is claimed are defined as follows:

1. A thermally-stable high surface-area catalyst carrier consisting essentially of active alumina granules on which there is coated the hydrated oxide of cerium, said coated alumina resulting from precipitation of the hydrated oxide of cerium from an aqueous slurry of the alumina granules and of water soluble salts of cerium, the resulting precipitate being separated and treated to remove the residual soluble salts resulting from the precipitation of $Ce(OH)_3$ and being heated to remove the free water therefrom.

2. A catalyst comprising a refractory ceramic support having a thermally stable high surface area catalyst carrier coating thereon consisting essentially of active alumina granules on which there is coated an oxide of cerium, said carrier coating including a catalytically-effective amount of at least one of the noble metals, platinum, palladium, and rhodium, wherein alumina is present in the amount of from about 93 to 96.5 parts by weight, cerium in the amount of from about 3.5 to 7 parts by weight, said coated alumina being produced by precipitation of the hydrated oxide of cerium from an aqueous slurry of the alumina granules containing water soluble salts of cerium, said noble metal being placed on said catalyst carrier while said oxide of cerium is in its hydrated form.

3. A catalyst comprising a refractory ceramic support, a catalyst carrier coating on said support, at least one of the noble metals selected from the group consisting of platinum, palladium and rhodium being dispersed on said coating, said coating comprising about 93 parts by weight alumina and about 7 parts by weight cerium as cerium oxide and resulting from precipitation of the hydrated oxide of cerium from an aqueous slurry of alumina granules containing water soluble salts of cerium, said noble metal being dispersed on said coating while said oxide of cerium is in its hydrated form.

4. A catalyst comprising a refractory ceramic support, a catalyst carrier coating on said support, at least one of the noble metals selected from the group consisting of platinum, palladium and rhodium being dispersed on said coating, said coating comprising about 96½ parts by weight alumina and about 3½ parts by weight cerium as cerium oxide and resulting from precipitation of the hydrated oxide of cerium from an aqueous slurry of alumina granules containing water soluble salts of cerium, said noble metal being dispersed on said coating while said oxide of cerium is in its hydrated form.

5. In a method for making a thermally stable high surface area catalyst carrier consisting of alumina granules coated with ceria, the steps of forming a slurry of active alumina in water, adding to said slurry an aqueous solution of a soluble salt of cerium while vigorously stirring said slurry, the resulting mixture being stirred for a period sufficient to assure uniform dispersion of the materials in the slurry, adding a precipitant such as ammonium hydroxide to said mixture in a quantity sufficient to precipitate the cerium from the solution onto the surface of the alumina granules at a pH of about 8 to 10 while continuing the stirring, separating the precipitate and removing substantially all soluble salts from the coated alumina granules, and drying the resultant coated alumina to remove the free water.

6. In a method for making a thermally stable high surface area catalyst, the steps of forming a slurry of active alumina in water, adding to said slurry an aqueous solution of a soluble salt of cerium while vigorously stirring said slurry, the resulting mixture being stirred for a period sufficient to assure uniform dispersion of the materials in the slurry, adding a precipitant such as ammonium hydroxide to said mixture in a quantity sufficient to precipitate the hydrated oxide of cerium from the solution onto the surface of the alumina granules at a pH of about 8 to 10 while continuing the stirring, separating the precipitate and removing substantially all soluble salts from the coating alumina granules, drying the resultant coated alumina to remove the free water, and thereafter dispersing a noble metal catalyst on the coated alumina while the cerium oxide is in its hydrated form.

* * * * *

UNITED STATES PATENT AND TRADEMARK OFFICE
CERTIFICATE OF CORRECTION

PATENT NO. : 4,331,565
DATED : May 25, 1982
INVENTOR(S) : Carl F. Schaefer and Raymond E. Bedford It is certified that error appears in the above-identified patent and that said Letters Patent are hereby corrected as shown below:

Column 6, line 38, after "were" insert -- changed to produce a dry coating of 103.04 grams with --.

Signed and Sealed this

Tenth Day of August 1982

[SEAL]

Attest:

GERALD J. MOSSINGHOFF

Attesting Officer

Commissioner of Patents and Trademarks